(12) United States Patent
Hartt

(10) Patent No.: US 10,935,409 B1
(45) Date of Patent: Mar. 2, 2021

(54) MEASURING CUP GIVING CONTENTS DEFINED SHAPE AS FORM OF INDICATION

(71) Applicant: Thomas Maxwell Hartt, Philadelphia, PA (US)

(72) Inventor: Thomas Maxwell Hartt, Philadelphia, PA (US)

( * ) Notice: Subject to any disclaimer, the term of this patent is extended or adjusted under 35 U.S.C. 154(b) by 0 days.

(21) Appl. No.: 16/747,731

(22) Filed: Jan. 21, 2020

Related U.S. Application Data

(60) Provisional application No. 62/795,352, filed on Jan. 22, 2019.

(51) Int. Cl.
*G01F 19/00* (2006.01)

(52) U.S. Cl.
CPC .................. *G01F 19/002* (2013.01)

(58) Field of Classification Search
CPC .................. G01F 19/002; G01F 19/00
See application file for complete search history.

(56) References Cited

U.S. PATENT DOCUMENTS

| | | | |
|---|---|---|---|
| 193,761 A | 7/1877 | Healy | |
| 423,018 A | 3/1890 | Young | |
| 923,618 A | 6/1909 | Blizard | |
| 1,168,027 A | 6/1916 | Nirdlinger | |
| 1,564,470 A * | 12/1925 | Crimmel | G01F 19/00 |
| | | | 73/427 |
| 2,931,230 A | 4/1960 | Lowery | |
| 3,931,741 A | 1/1976 | Ceccarelli | |
| 5,937,036 A | 8/1999 | Dean et al. | |
| 6,263,732 B1 * | 7/2001 | Hoeting | G01F 19/002 |
| | | | 33/1 V |
| 6,543,284 B2 | 4/2003 | Hoeting et al. | |
| 6,769,302 B1 | 8/2004 | King et al. | |
| RE39,827 E * | 9/2007 | Hoeting | G01F 19/002 |
| | | | 33/1 V |
| 7,306,120 B2 | 12/2007 | Hughes | |
| 8,061,197 B2 | 11/2011 | Silvers | |
| 8,382,730 B2 * | 2/2013 | Tauer | A61M 1/0019 |
| | | | 604/317 |
| 8,601,870 B2 | 12/2013 | Cogan et al. | |
| 8,844,354 B2 | 9/2014 | Herold | |
| 9,228,874 B2 | 1/2016 | Kent | |
| 9,341,508 B2 | 5/2016 | Redstone | |
| 9,345,638 B2 | 5/2016 | Ferrara | |
| 9,345,639 B2 | 5/2016 | Ferrara | |
| 9,354,098 B2 | 5/2016 | Breit et al. | |
| 9,605,988 B2 | 3/2017 | Kushner et al. | |
| D787,957 S * | 5/2017 | Tsengas | D10/46.2 |
| 9,891,090 B1 | 2/2018 | Harper, II | |
| 9,903,747 B2 * | 2/2018 | Rizun | G01F 19/005 |
| 9,983,040 B2 | 5/2018 | Ross | |
| 10,175,084 B2 * | 1/2019 | Agarwal | G01F 22/00 |
| 10,209,116 B2 * | 2/2019 | Alam | G01F 23/205 |

(Continued)

*Primary Examiner* — Jamel E Williams

(57) ABSTRACT

A measuring cup has vertical sections of the sidewall to shake materials against to help level them, angled sections to create a decrease in width toward the bottom of the measuring space and increase toward the top, rings made from edges of these sections which present contents in a well-defined shape and serve as indicia, and a coexistence of angled and vertical sections between rings which give the contents an ill-defined shape indicative of an incomplete measurement.

19 Claims, 8 Drawing Sheets

(56) References Cited

U.S. PATENT DOCUMENTS

| | | |
|---|---|---|
| 10,240,962 B2 | 3/2019 | Breit et al. |
| 10,436,623 B2 | 10/2019 | Alam et al. |
| 10,444,053 B2 | 10/2019 | Alam et al. |
| 10,520,346 B2 | 12/2019 | Alam et al. |
| 10,520,347 B2 | 12/2019 | Alam et al. |
| 10,533,886 B2 | 1/2020 | Alam et al. |
| 2005/0011261 A1 | 1/2005 | Lyon |
| 2007/0227245 A1 | 10/2007 | Green et al. |
| 2007/0245825 A1* | 10/2007 | Curtis .................. G01F 19/002 73/426 |
| 2009/0255333 A1* | 10/2009 | Henry .................... G01F 19/00 73/427 |

* cited by examiner

MEASURING CUP GIVING CONTENTS DEFINED SHAPE AS FORM OF INDICATION

CROSS-REFERENCE TO RELATED APPLICATIONS

This application claims the benefit of provisional patent application Ser. No. 62/795,352, filed 2019 Jan. 22 by the present inventor.

BACKGROUND OF THE INVENTION

Measuring cups and spoons are well-known, and commonly used in the kitchen for both liquids and solid fluent materials, such as spices. While there is some overlap between the volumes that culinary measuring cups and spoons are typically designed to measure, smaller volumes are usually measured with spoons. The tablespoon, teaspoon and partial-teaspoon volumes, for example, are almost always provided for by manufacturers and measured by consumers with the ubiquitous set of several small spoons, and not a cup. Unfortunately, these spoons do not offer all the great advantages of a cup.

With a cup, the user can measure contents from a container with an opening that is too small for a spoon to enter, or in which the contents are out of a spoon's reach, by pouring the contents into the cup, which is much easier to pour into than a measuring spoon. The process of measuring with a cup is simple, as it consists simply of pouring the materials into the cup and possibly lightly shaking the cup to level them. Measuring with a spoon is a multi-step process, often requiring selection and removal of the right spoon from a ring, or removal of a sieve from the container of materials, then insertion of the spoon, shaking off of excess material and careful removal and transportation of the spoon. A cup also consolidates the functions of numerous single-volume spoons, like those in a set, into one object.

A cup is cleaner and more sanitary because it is doesn't have to be inserted into food materials, which could risk contaminating them with bacteria or other materials. It is much easier to measure liquids with, since it can easily measure multiple volumes, and thus has a larger total volume than any one typical small spoon, allowing it to contain an unintended excess of liquid. It can also contain excess solid fluent materials in the same way, which one might otherwise attempt to pour into a spoon.

Yet culinary measuring cups are generally not used or manufactured in small sizes. This is because prior-art measuring cups are very unsuitable for measuring small volumes, especially of solid fluent contents.

Cylindrical cups are as wide throughout their measuring space as they are at its opening, which needs to be wide enough for the user to shake and pour contents into it easily. This can stretch the dimensions of a small volume like a teaspoon to the point where it is very short, making its indicator very close to the next immediate indicator and difficult to attribute to the contents versus the next indicator. This unsuitable width also allows solid fluent contents to shift laterally and become un-level by piling up to one side, making them difficult to measure.

Conical or angled cups provide narrower spaces for smaller volumes, but they can be very difficult to level contents with in the usual way, where the cup is shaken lightly to re-distribute the top layer of contents evenly. The top layer of a small and light volume of contents, like one from the culinary measuring-spoon set, can slide up and down the walls when shaken instead of leveling out: the surface does not change because the layer moves as a whole.

Prior-art measuring cups in general, of many sizes and applications, have a significant shortcoming: a user must confirm the desired volume by referencing a small indicator against a small segment of the surface of contents, even when an indicator is visible from above the cup. This process requires studying a small area which appears different from different angles, which requires some effort. This can be difficult or impossible for someone with poor eyesight. The user's analysis is required because these cups do not distinguish a correct volume from an incorrect one (one between indicia) unambiguously. Many of the tools in our lives offer the convenience of an unambiguous signal of "completion" that takes no effort to understand: a coffee machine beeps when it has made coffee; a poultry button pops at the correct temperature; a kettle whistles when it's boiling; a torque wrench "slips" when the correct torque is applied. Compared to many tools, these cups leave some things to be desired: they are not particularly effortless, communicative or confidence-inspiring.

It is an object of the present invention to provide an extremely clear and effortless form of indication. It is another object of the present invention, where the size of an embodiment permits, to effectively measure small volumes and provide a useful alternative to measuring spoons.

SUMMARY OF THE INVENTION

The invention is a volumetric measuring cup for fluent solid materials or fluids. It comprises an open upper end, a floor, a measuring space defined by an encircling sidewall, an extension of the sidewall above the measuring space, and a number of symbolic or numeric indicia. It may also comprise helpful features such as those common in the art, like a spout or handle.

Its sidewall comprises both angled and vertical sections. The angled sections allow the measuring space to narrow in width, thus providing narrower spaces for smaller volumes. This maximizes the height of the volumes to ensure that indicia are not too close together, and minimizes the width of the volumes so that solid fluent contents do not have excess space in which to move laterally. The vertical sections limit the lateral movement of solid fluent materials, which aids in leveling them by shaking the cup. By allowing the top layer to shift but confining the contents underneath, the top layer can be redistributed when the cup is shaken, instead of moving in place with the contents underneath them. These characteristics especially benefit the measurement of small volumes, such as the tablespoon, teaspoon, ½ teaspoon, etc.

These angled and vertical sections naturally form edges in the sidewall where they meet, as they possess different angles. A number of these edges are horizontal and form closed indicator rings. In the embodiment shown there are five indicator rings. These rings correspond to, and are a form of indicia for the volumes of the measuring space beneath them. A ring indicates that the volume below has been measured when the surface of contents is co-planar with the ring, by conforming the surface to the shape of the ring and defining it with the visual line made by its edges. Thus the invention has a highly obvious and expressive means of volume confirmation, by presenting measured contents in distinct shapes that are easy to see and recognize. This benefits users who have poor eyesight, workers who must expend minimal time and effort confirming volume, and any user who desires a confidence that the correct volume has been measured involving little effort. The cup also bears numeric or symbolic indicia informing the user what the volumes corresponding to the rings are. In the preferred embodiment they are immediately below the rings.

The portions of the sidewall between indicator rings comprise both angled and vertical sections. The angled and vertical sections both connect the rings above and below them. Consequently, both kinds of section span the height between indicator rings. This maximizes the slope of the angled sections, which ensures that materials slide down them easily. Because both kinds of section are present in these portions, one or more angled sections meets the surface of the contents when they are not measured by an indicator ring. This gives the surface an ill-defined shape, due to the varying degree to which it extends onto an angled section and/or its transparency on the bank of an angled section. Relative to contents measured by an indicator ring, the surface is also ill-defined because it does not fully correspond to a shape formed in the sidewall of the cup. As such the surface of contents between indicator rings is relatively ambiguous and ill-defined. Thus the invention differentiates measured and unmeasured volumes of contents in an obvious and expressive way, and enhances the obviousness that a certain volume has been measured.

In the preferred embodiment there are four vertical sections and four angled sections between rings, and the vertical sections contact the corners of the opening below and the sides of the opening above; conversely, the angled sections contact the corners of the opening above and the sides of the opening below.

In the preferred embodiment the indicator rings are polygonal, and specifically square and concentric, but they can have any shape or be off-centered. Polygonal rings increase the contrast between volumes measured and not measured by indicator rings. A polygonal shape consists of straight lines and hard angles (vertices) and looks vivid, inorganic, and human-made, whereas the ill-defined surface of contents between indicator rings has irregular lines and looks messy. Square rings, like those in the preferred embodiment, particularly increase this contrast by presenting a shape with few sides and hard right angles. Thus polygonal rings, particularly rectangular or square ones, enhance the differentiation effect of the measuring space with vivid shapes.

The uppermost ring is connected to an encircling extension of the sidewall, whereby contents of the cup are harder to spill if a user fills the cup to this ring, and a larger target area for the release of contents into the cup is provided if the measuring space itself does not provide an adequate one. In the preferred embodiment there is a slight angled extension of the sidewall. The bottom of the measuring space is closed, so that the cup can hold contents for measurement. In the preferred embodiment this closure comprises a flat floor, though in other possible embodiments it could comprise a point or curved surface. The portion of sidewall connecting this closure to the bottommost ring may have any shape, and as such may be vertical, or angled, or have both vertical and angled sections. In the preferred embodiment it comprises the same arrangement of vertical and angled sections that the portions between measuring-rings comprise. The cup also has a base or bottom of suitable size so it may stand upright.

The cup may also have a useful coloration where the portions of vertical and angled surfaces comprising the sidewall between indicator rings are different colors, so that a color is associated with every volume measured by the indicator rings, and obscuring a color with the contents of the cup provides another indicator of volume. It will be understood that nothing physically limits the cup from bearing traditional indicia between indicator rings, in addition to the indicator rings and their reference indicia, but that measuring the volumes between indicator rings would not benefit from the indicator rings.

The cup can be made from any material suitable for a measuring cup, such as plastic, metal, glass, or an elastic material such as silicone, and manufactured with any process suitable for its shape and material, such as injection-molding or industrial metalworking. Food-grade plastic or stainless steel is preferred.

DETAILED DESCRIPTION OF THE PREFERRED EMBODIMENT

Figure 1:
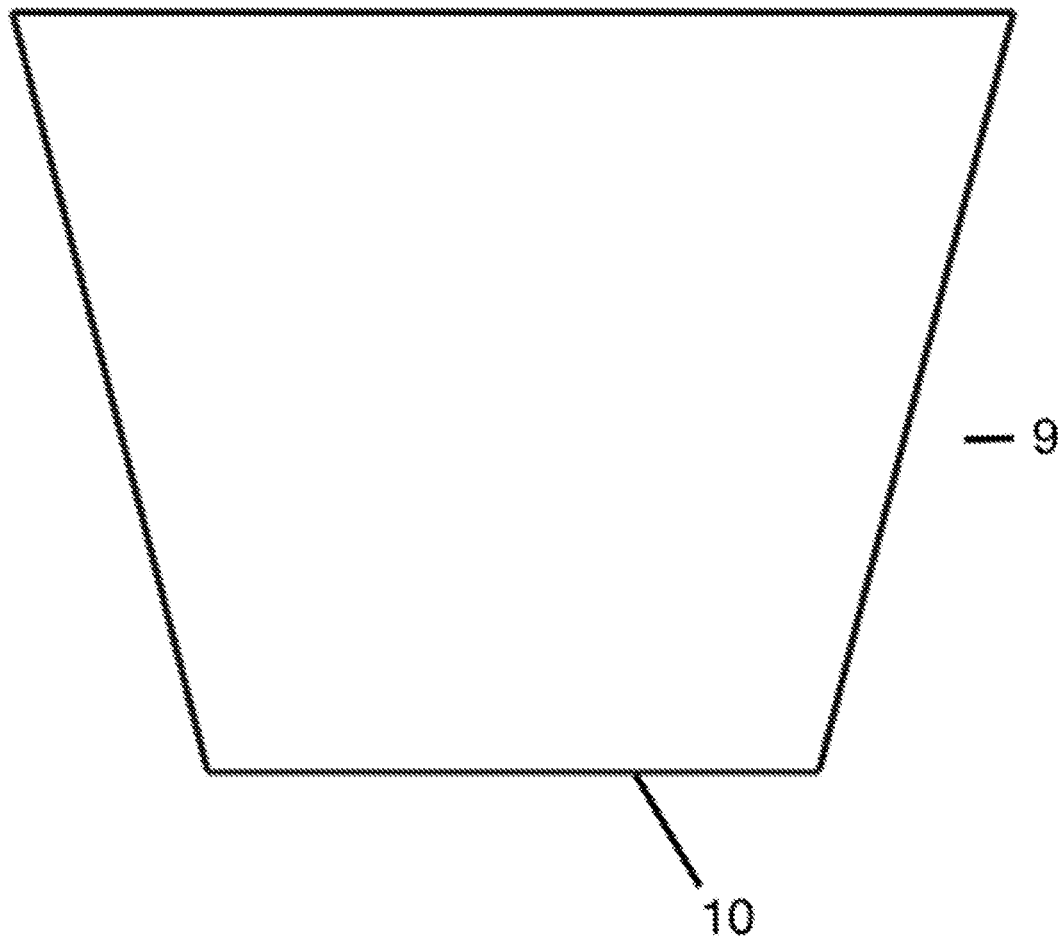
FIG. 1 is a side view of a measuring cup according to a preferred embodiment of the invention

FIGS. 1-4 show a preferred embodiment of the invention. A cup 9 is made from a formable material suitable for the art, and has a bottom 10 to stand it upright. The cup 9 has an open upper end beginning with an extension 11 integrally attached to the measuring space beneath it, ending with floor 12. In the preferred embodiment the floor is flat and square-shaped, but in other embodiments it may take other forms or be highly pointed, so long as it forms a closure of the measuring space. The measuring space is marked with five symbolic indicia, all shown in FIG. 3, of which one symbolic indicator 28 is referenced as an example. It will be understood that these may be imprinted, embossed, painted, stuck upon or mark the cup in any suitable way, that they may be on the outside of the cup such as when the cup is of transparent glass or plastic, and that they may vary in number depending on the number of volumes the cup is designed to measure. In the preferred embodiment they correspond to volumes commonly measured by a set of small culinary spoons, but the invention may take an embodiment of any size in which its use is beneficial.

Figure 2:
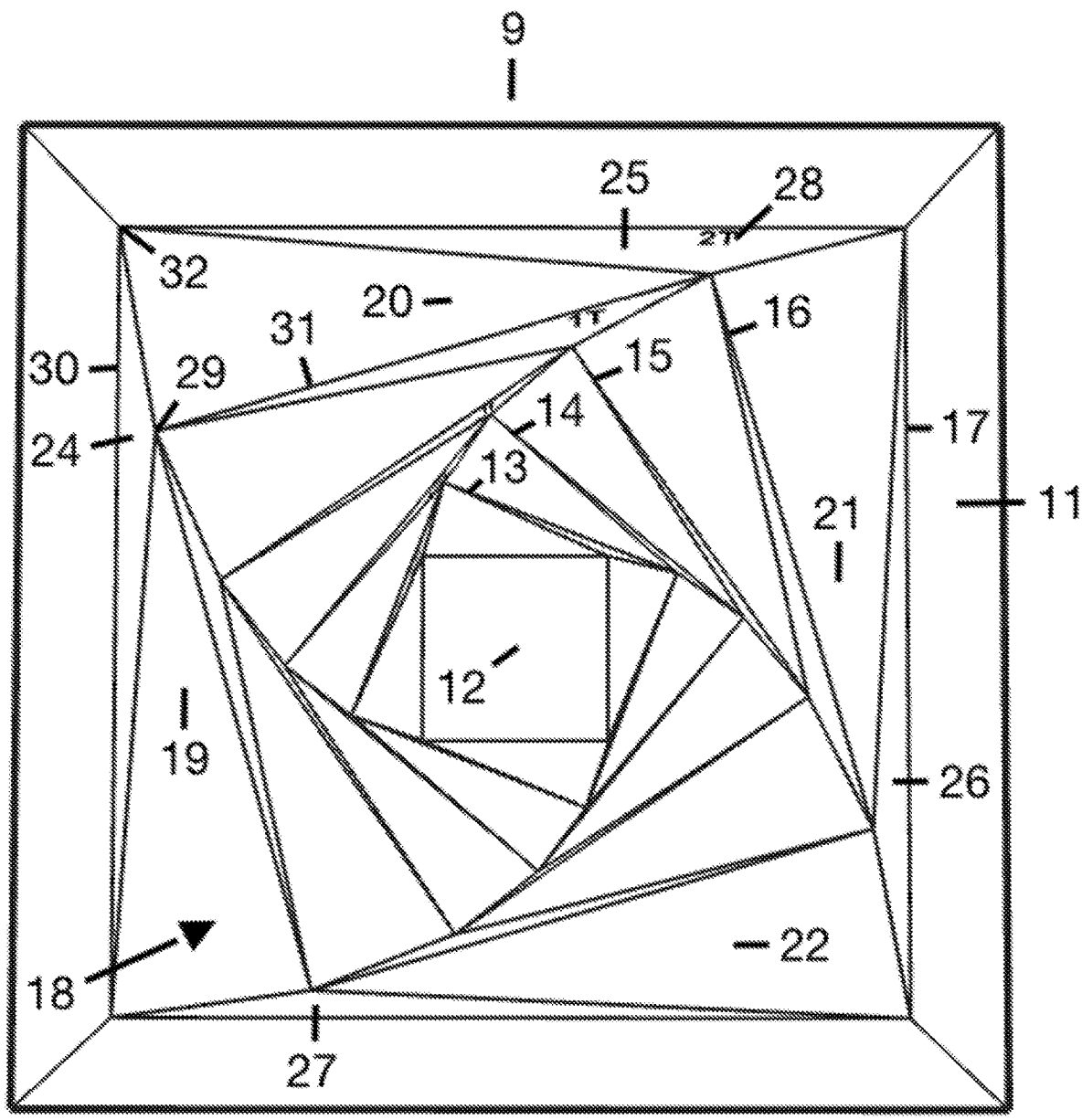
FIG. 2 is a top view of the same measuring cup
Figure 2A:
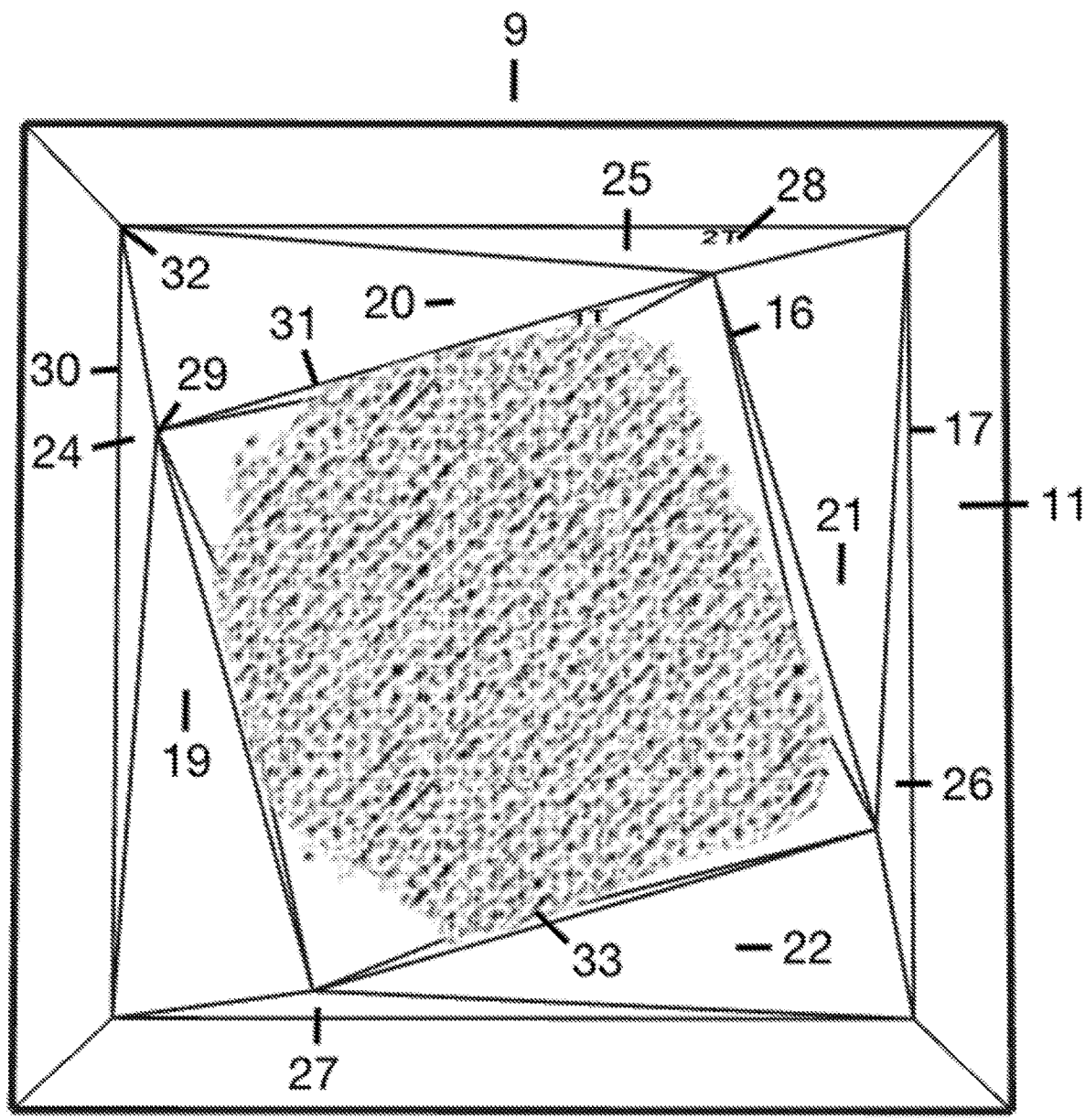
FIG. 2A is a top view of the same cup, accompanied by an illustration of ill-defined contents between indicator rings
Figure 3:
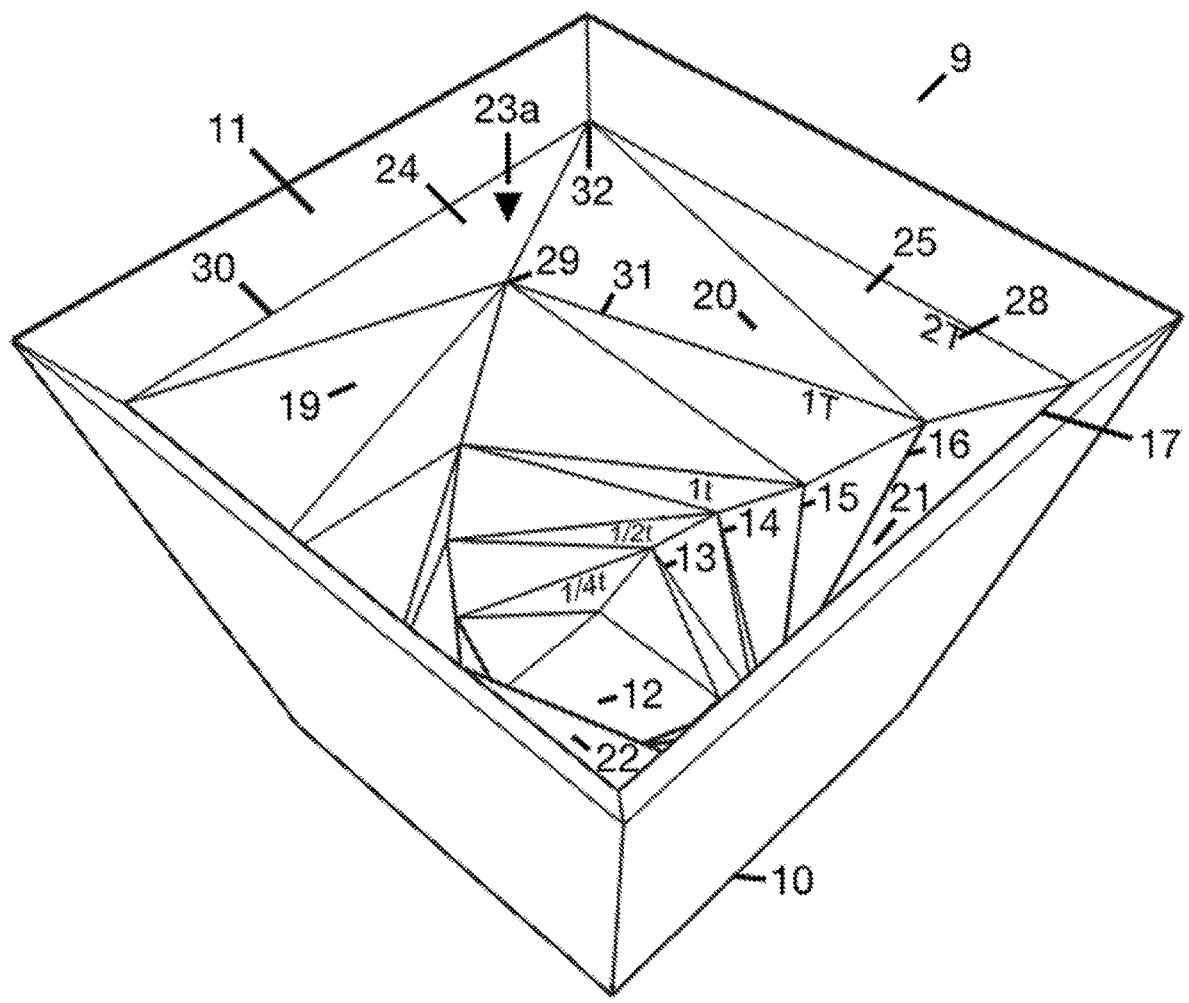
FIG. 3 is a perspective view of the same cup showing indicia in the form of characters
Figure 3A:
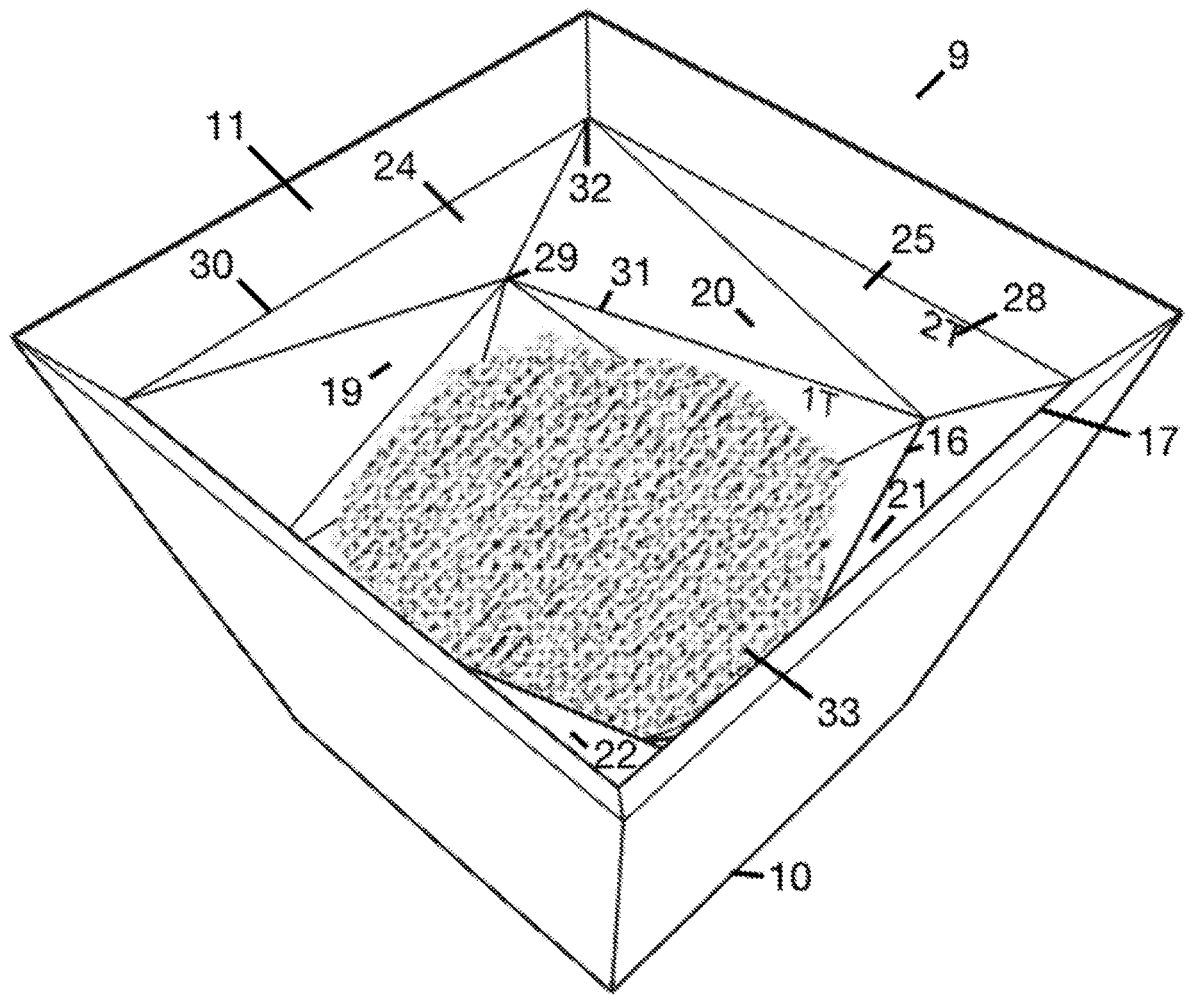
FIG. 3A is a perspective view of the same cup, accompanied by an illustration of ill-defined contents between indicator rings

The cup 9 has five indicator rings 13, 14, 15, 16, and 17 which are a form of indicia. The rings 13-17 are formed in the sidewall of the cup 9 and are integrally connected to each other with angled sections 18, which are all shown and referenced generally in FIG. 2. The rings 13-17 are also integrally connected with vertical sections 23a and 23b, which are referenced generally and all shown between FIG. 3 and FIG. 4. Angled sections 19, 20, 21, and 22 are examples of the angled sections and connect rings 16 and 17. Vertical sections 24, 25, 26, and 27 are examples of the vertical sections and also connect rings 16 and 17. Ring 17 is attached to extension 11 above it and ring 13 is integrally connected to floor 12 below it. In the preferred embodiment, rings below another ring are connected from their sides to the corners of the ring above them with angled sections 18. As an example, ring 16 is connected from a side 31 to a corner 32 of ring 17 above it with an angled section 20. Similarly, rings above another ring are connected from their sides to the corners of the ring below them with vertical sections 23a and 23b. As an example, ring 17 is connected from a side 30 to a corner 29 of ring 16 below it with vertical section 24. It will be understood that while this arrangement of coexisting sections is efficient for the preferred embodiment, other embodiments where the rings are connected with both angled and vertical sections are easily possible. In the preferred embodiment the lowest ring 13 is connected to the floor 12 with the same arrangement of angled and vertical sections obtaining between rings 13-17 and between ring 17 and extension 11. In other embodiments the lowest ring may be connected to the floor FIG. 2A and FIG. 3A show an illustration of ill-defined contents 33 (which will be understood as not a part of the invention) which are not co-planar with an indicator ring.

Figure 2B:
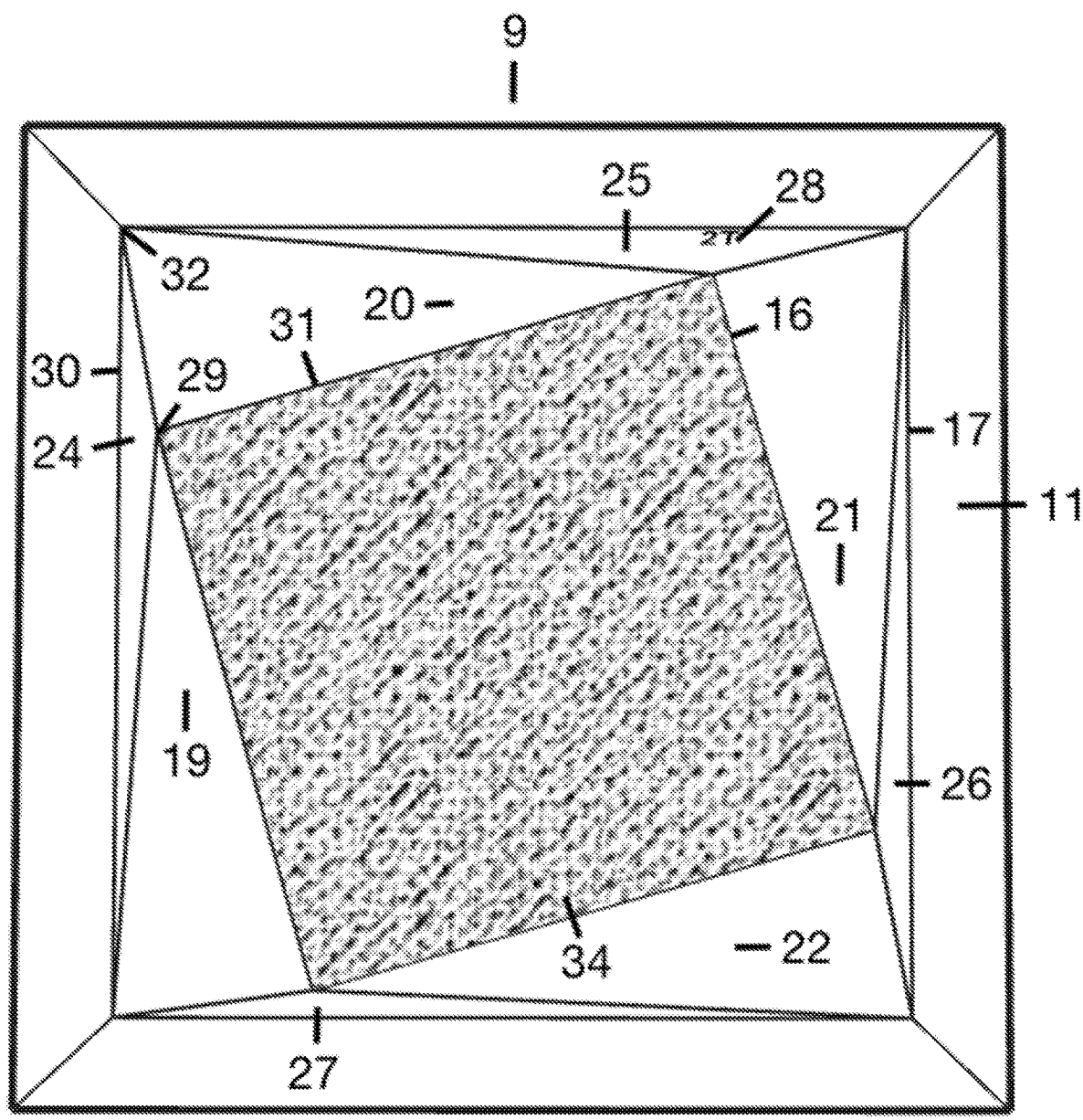
FIG. 2B is a top view of the same cup, accompanied by an illustration of well-defined contents coplanar with an indicator ring
Figure 3B:
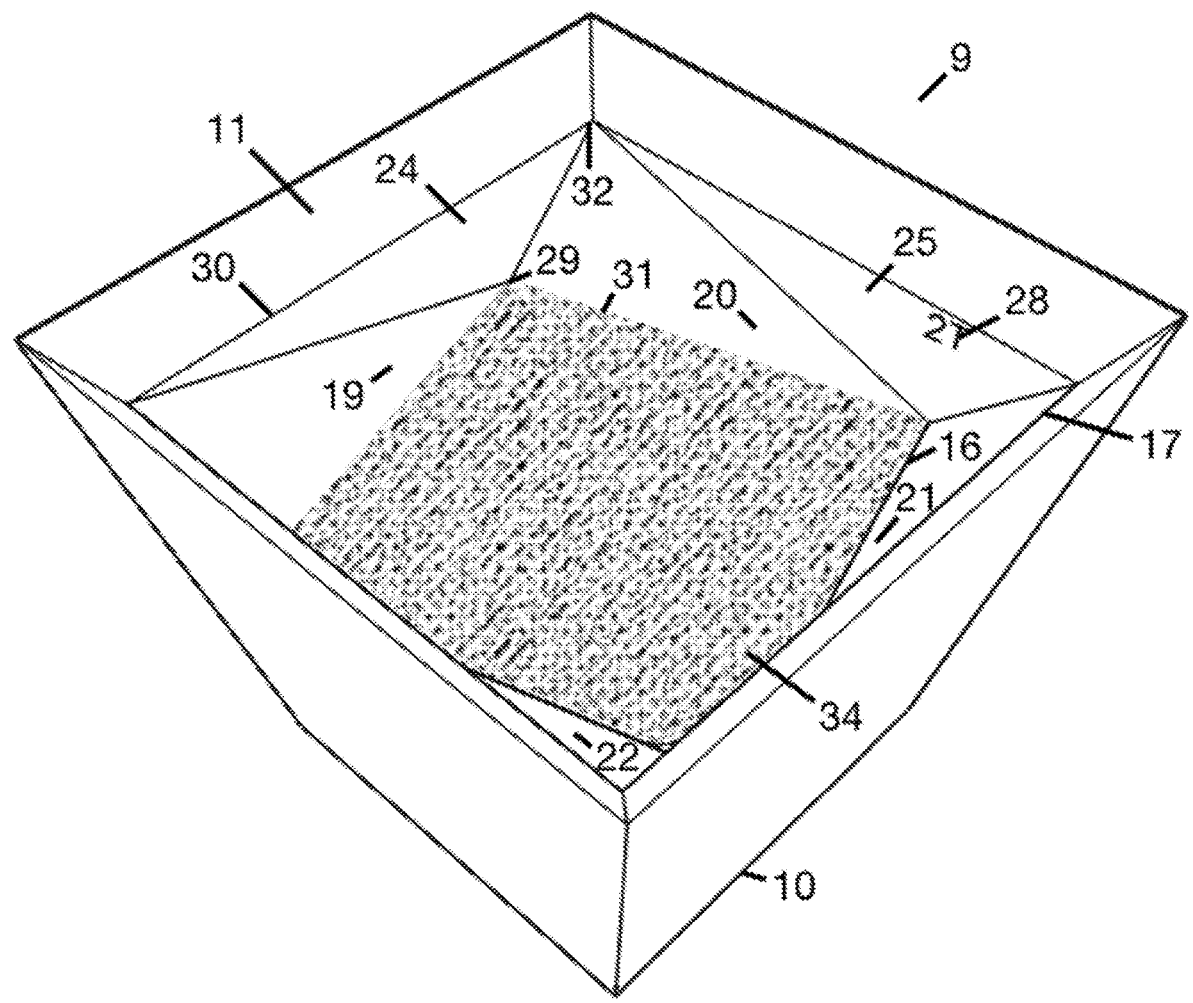
FIG. 3B is a perspective view of the same cup, accompanied by an illustration of well-defined contents coplanar with an indicator ring
Figure 4:
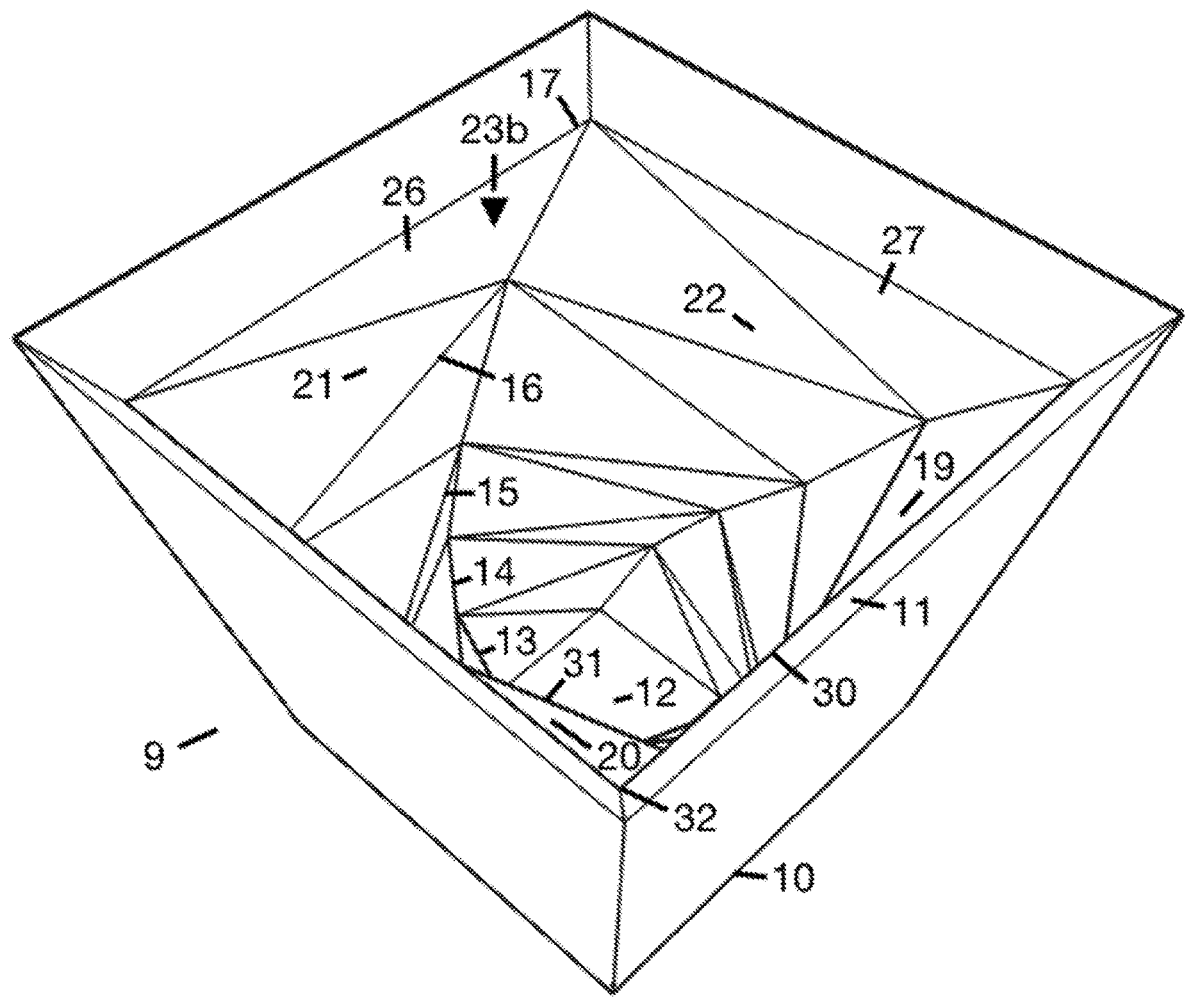
FIG. 4 is a perspective view of the same measuring cup from the perspective opposite that of FIG. 3 and showing vertical sections not seen in FIG. 3

FIG. 2B and FIG. 3B show an illustration of well-defined contents 34 (which will be understood as not a part of the invention) which are coplanar with an indicator ring 16 and formed in the shape of ring 16.

The preferred embodiment 9 is used by releasing (pouring, shaking, dropping, etc.), placing, or, where circumstances permit, scooping materials into the cup 9 until they are shaped and viewed by an indicator ring 13-17 corresponding to the desired volume, and, if necessary, at levels where vertical sections 23a and 23b obtain, lightly shaking the cup against vertical sections 23a and 23b in order to level the materials.

Those skilled in the art will understand from the drawings, this specification and the claims that various embodiments different from the preferred embodiment are possible and may comprise differences in geometry, or the inclusion of suitable components such as a handle or spout. No specificity discussed in the specification should be construed as limitations to the claims, and I wish to be limited only by the fullest scope of the claims.

I claim:

1. A measuring cup, comprising:
   a. means such as a base or bottom such that the cup can stand upright, and
   b. a volumetric measuring space for measuring liquids and/or solid fluent materials, and
   c. an encircling interior sidewall defining said measuring space, comprising a plurality of vertical or substantially vertical sections and a plurality of angled sections, and an extension issuing from said measuring space for containing excess contents, or also providing a greater opening, and
   d. means such that the cup may contain materials in said measuring space, such as a floor or pointed closure terminating the bottom of said measuring space, and
   e. a plurality of edges in said sidewall, said edges formed by the abutments of a number of said vertical sections with a number of said angled sections, or also formed by the abutments of either or both of said sections with said extension, wherein a number of said edges are horizontal, and
   f. a plurality of indicator rings in said sidewall each comprising one or more of said horizontal edges, wherein said horizontal edges are self-connected in a closed loop, said indicator rings possessing one or more shapes, said indicator rings indicating the volumes of said measuring space below them, by presenting the surface of contents in the well-defined shape or shapes, viewable from above said cup, of said indicator rings when contents possess the volumes below said indicator rings and their surface is coplanar with said indicator rings, whereby an explicit, obvious and visually pleasing means of volume indication is provided, and
   g. a plurality of numeric or symbolic indicia visible on the interior or exterior of said cup expressing what volumes are measured by said indicator rings, and
   h. a number of said angled sections and said vertical sections both comprising the portions of said sidewall between said rings, wherein said angled sections and said vertical sections both connect to said rings immediately above and below them, such that they are both present at any height between said indicator rings, the presence of both causing a surface of contents between said indicator rings to have an ill-defined shape, by giving the surface of contents irregular and/or semi-transparent borders extending to various degrees upon said angled sections, and by not aligning with a shape defined by said sidewall of said cup,
   whereby said measuring space narrows in width, providing appropriate widths for small volumes, and provides surfaces throughout to level a solid fluent material against by shaking, and differentiates contents not possessing a volume corresponding to an indicator ring by giving their contents an ill-defined shape.

2. The measuring cup of claim 1, wherein said portions of said sidewall between said indicator rings are different colors,
   whereby these colors and their obscuration by contents measured by said indicator rings provide further means of indication.

3. The measuring cup of claim 1, further comprising a handle attached to said cup.

4. The measuring cup of claim 1, further comprising a spout attached to or formed in said extension of said sidewall.

5. The measuring cup of claim 1, wherein said portions of said sidewall between said indicator rings are different colors, and further comprising a handle attached to said cup.

6. The measuring cup of claim 1, wherein said portions of said sidewall between said indicator rings are different colors, and further comprising a spout attached to or formed in said extension of said sidewall.

7. The measuring cup of claim 1, further comprising a handle attached to said cup, and further comprising a spout attached to or formed in said extension of said sidewall.

8. The measuring cup of claim 1, wherein said portions of said sidewall between said indicator rings are different colors, further comprising a handle attached to said cup, and further comprising a spout attached to or formed in said extension of said sidewall.

9. The measuring cup of claim 1 wherein said indicator rings are polygonal, conforming the surface of measured materials to a shape having straight lines and hard angles, whereby contents measured by said indicator rings are greatly differentiated from contents not measured by said indicator rings and having an ill-defined surface.

10. The measuring cup of claim 9, wherein said portions of said sidewall between said indicator rings are different colors, whereby these colors and their obscuration by contents measured by said indicator rings provide further means of indication.

11. The measuring cup of claim 9, further comprising a handle attached to said cup.

12. The measuring cup of claim 9, further comprising a spout attached to or formed in said extension of said sidewall.

13. The measuring cup of claim 9, wherein said portions of said sidewall between said indicator rings are different colors, and further comprising a handle attached to said cup.

14. The measuring cup of claim 9, wherein said portions of said sidewall between said indicator rings are different colors, and further comprising a spout attached to or formed in said extension of said sidewall.

15. The measuring cup of claim 9, further comprising a handle attached to said cup, and further comprising a spout attached to or formed in said extension of said sidewall.

16. The measuring cup of claim 9, wherein said portions of said sidewall between said indicator rings are different colors, further comprising a handle attached to said cup, and further comprising a spout attached to or formed in said extension of said sidewall.

17. The measuring cup of claim 9, wherein a number of said indicator rings are rectangles, conforming the surface of contents measured by them to a shape with right angles and relatively few sides,
   whereby contents measured by said indicator rings are further differentiated from contents not measured by said indicator rings and having an ill-defined surface.

18. The measuring cup of claim 17, wherein said portions of said sidewall between said indicator rings are different colors.

19. The measuring cup of claim 17, wherein said portions of said sidewall between said indicator rings are different colors, and further comprising a handle attached to said cup.

\* \* \* \* \*